UNITED STATES PATENT OFFICE 2,571,329

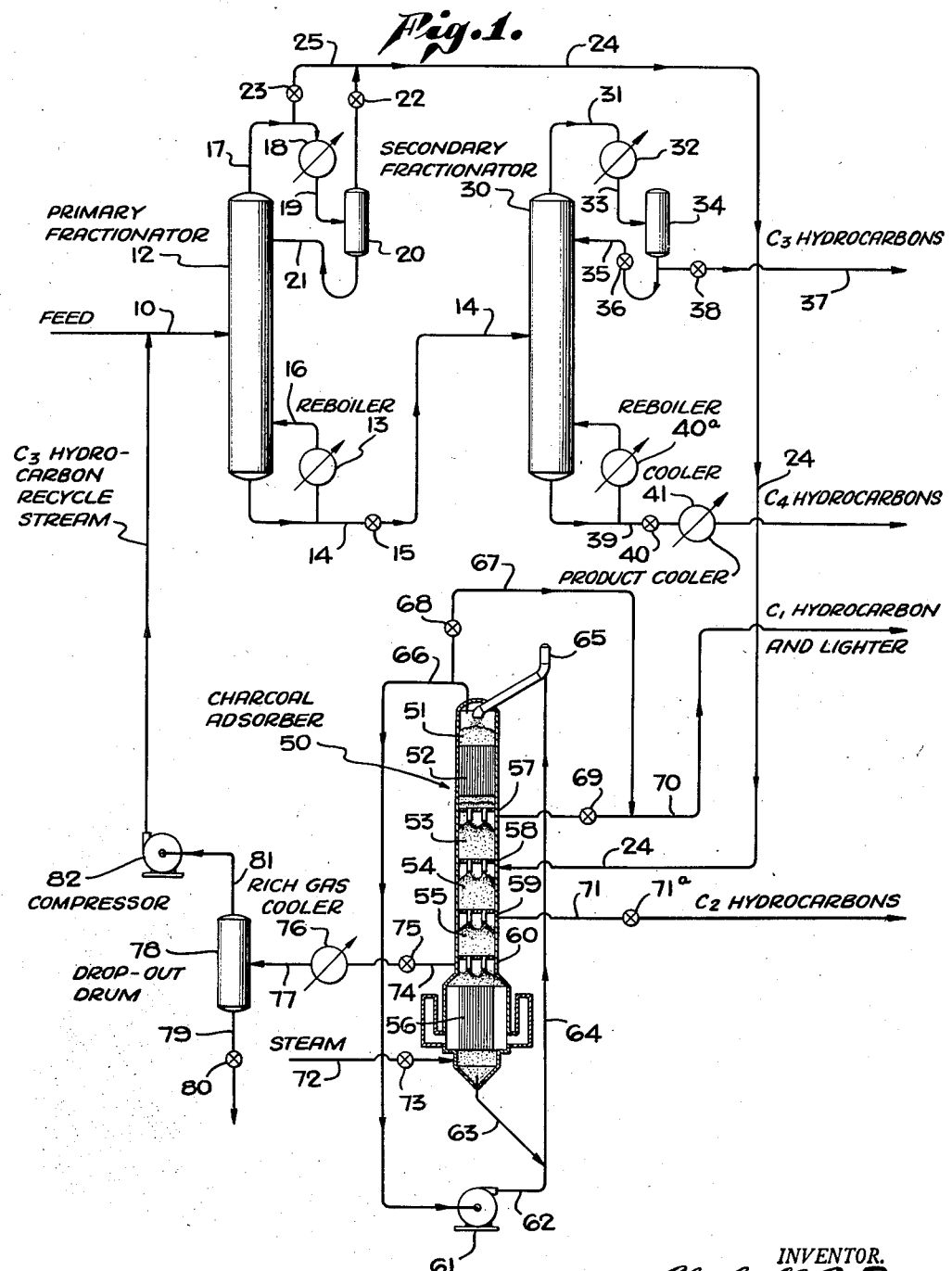

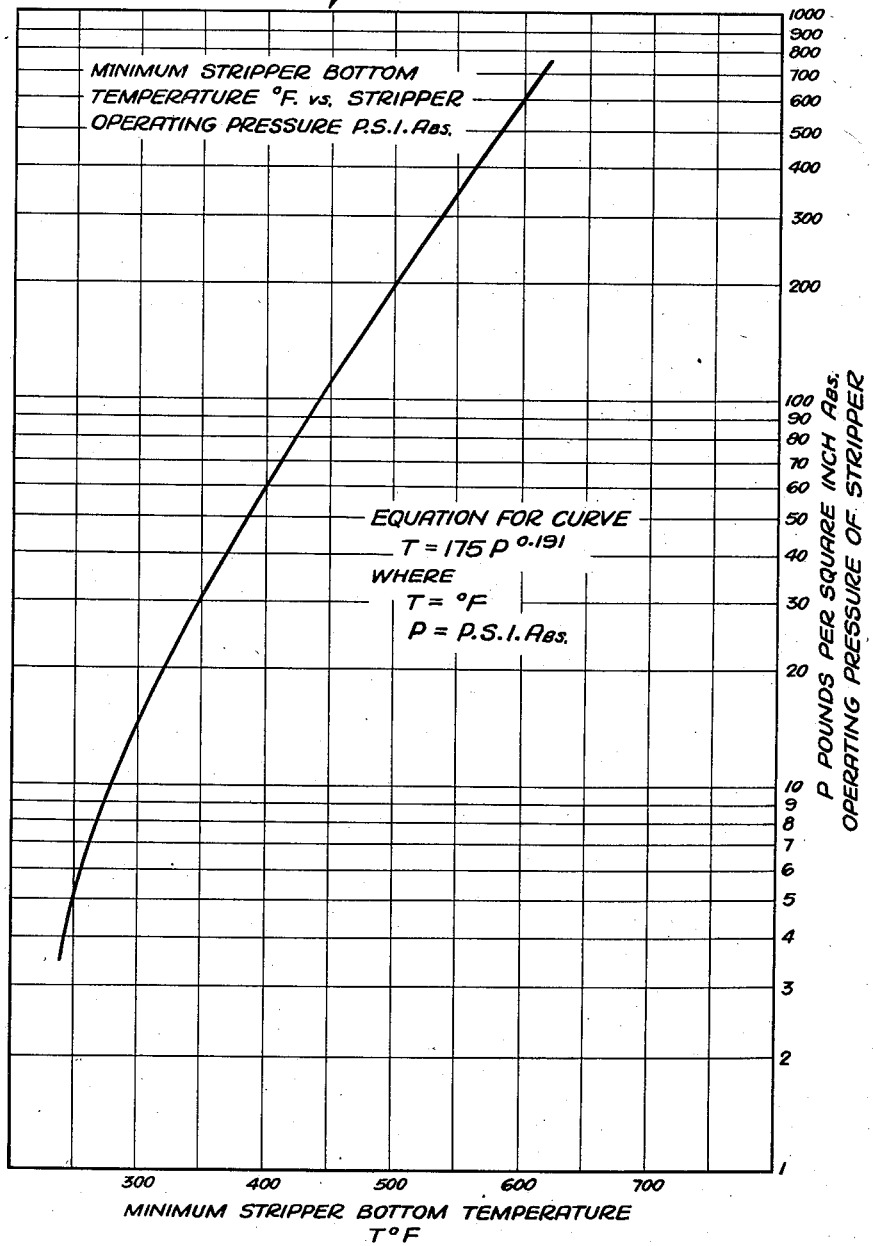

ADSORPTION PROCESS

Clyde H. O. Berg, Long Beach, Calif., assignor to Union Oil Company of California, Los Angeles, Calif., a corporation of California Application December 13, 1946, Serial No. 716,046

17 Claims. (Cl. 62—122)

This invention relates to the separation of gaseous mixtures into individual components or fractions by the selective adsorption of certain components or fractions thereof on a solid adsorbent. This invention is more particularly directed to the separation by the selective adsorption of the gaseous mixture on granular charcoal of certain gases, containing one or more unsaturated or olefinic components which render the separation by conventional means inefficient or uneconomical.

Conventional means for effecting the separation of the component parts of such mixtures include fractional distillation, solvent extraction, combined oil absorption and stripping, selective adsorption and similar processes. In order to effect separations using fractional distillation or solvent extraction the stream to be treated must first be liquefied by the application of pressure or a reduction in temperature, or both. Difficulties are encountered in applying these processes alone where the stream to be treated contains components possessing low critical temperatures requiring high pressure to cause liquefaction, and oftentimes results in rendering the use of these methods impracticable from either operation or economic standpoints. The use of oil absorption and stripping may be made without liquefaction of the stream to be treated. However, the components contined therein having low critical temperatures are not absorbed in commonly used absorbents to any great extent, requiring the use of extreme pressures and the circulation of large quantities of the absorbing medium in order to effect the desired separation. These conditions cause excessive equipment and operating costs. In cases where the gaseous mixture to be treated contains individual components with widely variant boiling points, the application of high pressures is required for the absorption of the lower boiling components with the subsequent use of temperatures of from about 200° F. to about 500° F. to effect the removal of the higher boiling components therefrom. Temperatures of this order of magnitude are sufficiently high to cause excessive polymerization of any unsaturated components or hydrocarbons in a stream to be treated resulting in a decidedly uneconomical operation because of the value of such unsaturates as chemical raw materials.

Gaseous mixtures containing these valuable components are produced in large quantities in many processes, for example, in the thermal or catalytic cracking of hydrocarbon fractions for the production of high grade fuels or the cracking of lower molecular weight hydrocarbon fractions for the production of unsaturated hydrocarbons specifically for use in synthetic organic chemicals manufacture. In such processes the hydrocarbon feed stock, such as, for example, gas oil, or the like, is subjected to pyrolysis or cracking by treatment at extreme temperatures at which decomposition is caused, or by contacting with a catalyst at somewhat more moderate temperatures. Following the cracking operation the products thereof are cooled to near atmospheric temperatures causing the formation of a liquid condensate containing the normally liquid hydrocarbons of the product together with some dissolved normally gaseous hydrocarbons, and a gaseous phase consisting predominantly of the normally gaseous hydrocarbons and saturated with a certain amount of the normally liquid hydrocarbons.

This gaseous fraction of the cracked or pyrolyzed feed stock generally contains a mixture of hydrocarbons of the aliphatic or saturated series ranging from methane, through ethane, propane, butane, isobutane and even pentane and isopentanes together with hydrogen. Also contained therein and characteristic of such cracked gases are the olefinic or unsaturated components which may include acetylene, ethylene, propylene, methyl acetylene, the butylenes and butadiene, and in some cases higher unsaturated hydrocarbons such as the pentenes or amylene and higher diolefins such as pentadiene and cyclopentadiene, and the like. The relative amounts of these higher boiling components present in the gaseous phase depends largely upon the temperature and pressure at which the cracked product, that is to say, the liquid and gas phases, are separated. The unsaturated hydrocarbons in the gas produced are of considerable value because of their high chemical activity permitting their convenient conversion into such commodities as alcohols, ketones, halogenated solvents, and other synthetic organic chemicals. Certain forms of synthetic rubber are manufactured by causing such olefins or diolefins or other such unsaturated hydrocarbons to react with one another through means of thermal or catalytic polymerization. Certain constituents, namely, the butenes and isobutylenes are of value as raw materials for production, through alkylation or polymerization, or like processes, of valuable antiknock agents for use in compounding high octane internal combustion fuels. However, recovery of even moderately pure components from the aforementioned mixture is difficult and expensive due to the temperature and pressure considerations required in such recoveries, because of its wide boiling range, and other reasons previously mentioned. As a result, such cracked gases are often wasted by venting to the atmosphere or disposed of as low-value fuel gas.

It has been found that such mixtures of cracked gases containing substantial quantities of unsaturated compounds may be more conveniently and more efficiently separated by the application of a modification of the process of selective adsorption on a solid granular adsorbent as hereinafter more clearly described.

In general the process of separating gaseous mixtures by selective adsorption on granular adsorbents, such as for example, activated charcoal, activated alumina, or silica gel, or the like, involves the steps of contacting countercurrently the gaseous mixture with the said adsorbent, preferably in a moving bed. In a moving bed operation the adsorbent, upon which certain of the gaseous components have been adsorbed flows from the adsorption zone through one or more rectification zones and into a stripping section wherein the adsorbed components are caused to be desorbed from the adsorbent by the application of heat and in the presence of a stripping gas, such as, for example, steam. The stripped charcoal is subsequently cooled prior to repassage through the adsorption section.

Solid adsorbents generally adsorb certain gases more strongly than others and the process of selective adsorption is based upon this phenomenon. In the case of charcoal as the absorbent those hydrocarbon gases having the higher boiling point or higher molecular weight are adsorbed preferentially over those having the lower boiling point or molecular weight. In the non-hydrocarbon gases there appears to be a correlation of adsorption with the critical temperature of the gas, those having low critical temperatures like hydrogen and helium being substantially unadsorbed.

More specifically the selective adsorption process involves the maintenance of a continuous flow of a granular adsorbent through an adsorption column. The adsorption column may consist of a reservoir for the adsorbent located in the upper portion thereof, a cooling section placed directly beneath, with the adsorption section located directly below the cooling section. One or more rectification sections are located below the adsorption section and a stripping section is located in the lowest portion. The flow of granular adsorbent is by gravity from the reservoir at the top of the adsorption column through said sections previously named, down through the stripping section and out the bottom thereof. The apparatus is provided with means for lifting the stripped charcoal from the lower section of the stripper to the top of the column and discharging it through a separator into the reservoir. Means are also provided for control of the rate of charcoal throughput.

It is the purpose herein to disclose certain improvements in the selective adsorption process when it is applied to the separation of highly unsaturated gaseous hydrocarbons from gaseous mixtures of hydrocarbons. The presence of heavy or normally liquid hydrocarbons has a marked deleterious effect on the adsorbent, said heavy components being present in the feed as such or formed from thermal polymerization of those unsaturated or thermally sensitive components of gaseous mixtures in those portions of the adsorption column wherein elevated temperatures are used. These heavy components are not easily removed by the conventional low temperature stripping and the accumulation of said components will cause a decrease in the adsorption capacity of the adsorbent necessitating their removal by a steam reactivation at temperatures considerably above those normally used in the stripping operation. Many of the individual unsaturated components existing in such gaseous mixtures, such as for example, methyl acetylene, butadiene, cyclopentadiene, and the like, are extraordinarily susceptible to such polymerization reactions even at temperatures as low as 200° F. The use of low temperatures is therefore essential from the standpoint of efficient operation in recovering in pure form substantially all of the unsaturated materials should they be desired products, and the prevention of the formation of polymers which are in general normally liquid or solid compounds which impair the potential adsorption capacity of the adsorbent.

It is an object of the present invention, therefore, to provide an improved process and apparatus for the separation of unsaturated hydrocarbons or thermally sensitive gaseous mixtures through selective adsorption.

It is a further object of the invention to provide an improved selective adsorption process and apparatus for treatment of highly cracked hydrocarbon gases containing about 5 carbon atoms or less per molecule, and other normally gaseous mixtures which contain substantial quantities of olefinic or otherwise unsaturated hydrocarbons in such a manner that temperatures are retained at nominal values with low temperatures high enough so that abnormal refrigeration duties are not required and high temperatures which are not sufficiently high to cause polymerization on the adsorbent of unsaturated compounds resulting in impaired adsorbent activity and low recoveries.

Another object of the invention is to provide a process and apparatus for the resolution of highly unsaturated gaseous admixtures by selective adsorption at nominal pressures, thereby reducing excessive compression facilities and associated heavy equipment attendant with extreme pressure operation.

It is another object of my invention to improve the efficiency of operation of the selective adsorption process and apparatus in the treatment of unsaturated gaseous mixtures through the use of the circulation of a certain portion of said mixture separated from the original feed stock to the feed inlet so that improved separation results giving more nominal temperatures and subsequently more complete recovery of the more desirable components.

Other objects and advantages of the invention will become apparent to those skilled in the art as the description thereof proceeds.

The above contemplated objects of my invention are accomplished by combining with the selective adsorption process certain preliminary distillation steps associated together to form an integrated unit wherein a normally gaseous mixture containing unsaturated components subject to thermal polymerization, such as for example olefin, diolefin and substituted acetylene hydrocarbons, may be separated economically into a number of comparatively pure fractions while at the same time realizing a high recovery of each fraction thereof.

In the process of selective adsorption which I have previously proposed a normally gaseous mixture containing for example, hydrogen, methane, ethylene, and ethane, $C_3$ and $C_4$ hydrocarbons may be divided into two or more fractions containing substantially pure components of the gaseous mixture. The separation of gaseous mixtures more highly unsaturated than the mixture cited above, that is to say, a gaseous mixture containing substantial amounts of components which are more unsaturated than ethylene and therefore thermally sensitive and subject to thermal polymerization, may be efficiently and conveniently recovered in pure form by employing the methods and apparatus of the present invention.

A recycle stream, produced from the adsorber and consisting of a high concentration of the intermediate molecular weight components of the feed, is used to enrich the feed to the fractionation unit, which permits the removal therefrom of certain components present in the gaseous feed which are detrimental to the activity of the adsorbent. The reflux temperature in the primary fractionator unit is caused to increase thereby reducing the refrigeration demand of supplying reflux at abnormally low overhead temperatures and simultaneously increasing the unsaturate recovery by reducing the fractionator bottoms temperature to a value at which substantially no polymerization occurs. Such operation permits the production of fractions of the original gaseous admixture containing desirable components in a state of high purity.

The process and apparatus of my invention may be more fully understood by reference to the accompanying illustration, Figure 1, wherein is shown a schematic flow diagram of the apparatus adapted to carry out separations of gaseous mixtures according to the principles and methods of the present disclosure, and Figure 2, wherein is shown a curve indicating the minimum stripper bottom temperature for various operating pressures.

Referring to Figure 1 which represents a general flow diagram of apparatus adapted to carry out the process of my invention, the highly unsaturated and normally gaseous mixture which may, for purposes of clear description, be considered to be a hydrocarbon mixture comprising hydrogen and $C_1$, $C_2$, $C_3$, and $C_4$ saturated and unsaturated components, is fed into the system in a condensed or partially condensed state through feed line 10 entering into the primary fractionator 12 together with a $C_3$ hydrocarbon recycle stream 11 as hereinafter more fully described. In the primary fractionator 12 a rough separation of the feed into two fractions thereof is effected in such a manner that a portion of the propylene and propane components of the $C_3$ fraction of the feed entering the fractionator is present in approximately equal proportions in both overhead and bottoms fractions produced from said fractionator. Part of the propylene-propane, together with substantially all of the higher molecular weight hydrocarbons is removed as a residue from the primary fractionator 12. A portion of the residue is reboiled in reboiler 13 supplying vapor to fractionator 12 by means of line 16. The remainder is removed by means of line 14 controlled by valve 15 and subsequently separated into two substantially pure $C_3$ and $C_4$ fractions in the secondary fractionator 30.

Fractionator 30 effects a carefully controlled fractionation between the $C_3$ components comprising for example, propane, propylene, methyl acetylene, and the like, and $C_4$ and higher molecular weight components comprising for example, butadiene, butenes, butanes, pentenes and pentanes. The vapor overhead from the secondary fractionator 30 comprising said $C_3$ fraction is withdrawn therefrom by means of line 31 and conducted thereby to overhead condenser 32, wherein liquefaction of the overhead $C_3$ fraction is effected. The liquid thus formed is conducted by means of line 33 into reflux drum 34, the liquid subsequently providing reflux for the secondary fractionator 30 by means of line 35 controlled by valve 36. Amounts of this liquid in excess of reflux requirements are sent to production by means of line 37, controlled by automatic valve 38 operated by the liquid level existing in reflux drum 34. The $C_4$ fraction, substantially free of $C_3$ contaminants is removed from the bottom of secondary fractionator 30 and a portion is reboiled in reboiler 40a supplying heat to the column. The remainder is removed as a liquid residue from the secondary fractionator by means of line 39 controlled by valve 40 and the liquid residue is subsequently cooled in cooler 41 before being sent to production.

The remaining portion of the propane-propylene content of the enriched feed not removed with the residue of primary fractionator 12, together with the lower molecular weight components of the feed comprising hydrogen, methane, acetylene, ethylene, ethane, propylene and propane is withdrawn from primary fractionator 12 as an overhead vapor by means of line 17 and conducted to overhead condenser 18 wherein the higher molecular weight components of the stream are condensed. The vapor and liquid so obtained are conducted to reflux drum 20 by means of line 19, the liquid providing reflux to the fractionator by means of line 21 and the vapor therein being joined with a certain proportion of the uncooled vapor withdrawn from line 17 by means of line 25 controlled by valve 23 in such amounts that the only refrigeration required is that to produce liquid for reflux. The combined streams of the lower molecular weight components are subsequently conducted by means of line 24 to the continuous selective adsorber 50.

The adsorber may employ as the adsorbing medium one of several applicable adsorbents, but for purposes of clear description this commodity will be considered to be charcoal. The adsorber comprises a charcoal reservoir 51, a cooling section 52, an adsorption section 53, a primary rectification section 54, a secondary rectification section 55 and a desorption section 56. Located between the cooling, adsorption, rectification and desorption sections are disengagers 57, 58, 59 and 60 providing means whereby the gaseous feed may be introduced into the adsorption section and whereby the product streams may be separated from the adsorption or rectification sections. Charcoal flowing from the reservoir 51 passes successively down through the cooling section, the adsorption section, the two rectification sections, the desorption section and passes by means of line 63 from the bottom of the adsorber into the conveyance means provided to move the charcoal from the bottom to the top of the adsorber. The conveyance system as herein shown consists of a blower 61 provided to energize the lift gas which passes through line 62 to the lower end of transfer line 63 at which point contact with the charcoal discharged from the bottom of the desorption section is made. The lift gas causes the conveyance of the charcoal from the point of connection with line 62, up through lift line 64 into impactless separator 65, where due to an enlargement in cross sectional area the charcoal is disengaged from the lift gas and is caused to flow into the charcoal reservoir 51 at the top of the adsorber. The lift gas is returned from the top of reservoir 51 by means of line 66 to blower 61. In some instances, it is desirable to allow a certain amount of the lean gas produced in the adsorption unit from disengager 57 to pass up through cooler 52 thereby preventing the accumulation of moisture on the charcoal in the cooler and the reservoir above. In cases of such operation vent line 67 controlled by valve 68 must be provided to allow for the removal of accumulations of lean gas resulting from such operations which will form in the gas lift. Provided in the discharge line 70 is control valve 69 which causes a pressure reduction thus allowing the vent gas, bled through line 67 from line 66, to flow back into the lean gas stream removed from the adsorber at disengager 57, resulting in a higher recovery of the desirable components of the lean gas stream.

The feed to the adsorption column produced as overhead product of the primary fractionator and consisting predominantly of hydrogen, $C_1$, $C_2$ and $C_3$ hydrocarbons, is introduced by means of line 24 into disengager 58 and flows upward countercurrently to the charcoal through adsorption section 53. During the passage of the feed gas through the adsorption section the heavier components of the feed, in this case the $C_3$ fraction and to a lesser extent the $C_2$ hydrocarbons, are adsorbed on the surface of the charcoal, substantially completely preventing any adsorption thereon of the lighter components, i. e., methane and hydrogen. Under such conditions these lighter components pass upward relatively unadsorbed through the adsorption section and are disengaged from the charcoal at disengager 57 and leave the adsorber by means of line 70 in a relatively pure state.

The charcoal flowing down through adsorption section 53 and containing the higher molecular weight components of the feed, carries these components through disengaging section 58 and into primary rectification section 54. The charcoal entering primary rectification section 54 is saturated with $C_2$ and $C_3$ hydrocarbons and may contain small amounts of methane. Here the downwardly flowing charcoal is contacted with additional quantities of $C_2$ hydrocarbons whereby any residual methane or hydrogen present is desorbed and removed from the charcoal by virtue of the preferential adsorption of the $C_2$ hydrocarbons with respect to methane and hydrogen. The desorbed methane and hydrogen subsequently pass upward countercurrently to the charcoal back through disengager 58 into adsorption section 53. The charcoal, free of adsorbed methane and hydrogen, flows from the primary rectification section through disengager 59 into the secondary rectification section 55. Here the charcoal is contacted with quantities of $C_3$ hydrocarbons causing the desorption of the $C_2$ hydrocarbons by virtue of the preferential adsorption by the charcoal of components of higher molecular weight. In such a manner the charcoal flowing downward in the lower half of the secondary rectification section is substantially saturated with $C_3$ hydrocarbons to the exclusion of previously adsorbed $C_2$ components. The $C_2$ hydrocarbons desorbed from the charcoal in the secondary rectification section flow upward countercurrently to the charcoal and leave the secondary adsorption section in one of two paths; the first being passage through disengager 59 upward into the primary rectification section to constitute a reflux which serves to remove methane and hydrogen from the charcoal in that section, and the second being the passage of the $C_2$ hydrocarbons into the free space provided by disengager 59 and the subsequent removal through line 71 controlled by valve 71a. This fraction of $C_2$ hydrocarbons is produced as a "side cut" in relatively pure form although containing small amounts of the $C_1$ and the $C_3$ components. The charcoal in the secondary rectification section passes downward through disengager 60 and enters the desorption section 56.

Desorption section 56 is provided with means for heating the charcoal to a temperature above a certain minimum as hereinafter more fully described which is sufficiently high so that the adsorbed $C_3$ hydrocarbons may be desorbed, but which will not cause undue wetting of the charcoal when steam as stripping gas is used. To aid in the removal of adsorbed $C_3$ hydrocarbons from the charcoal a stripping gas, such as steam for example, is employed in the form of an internal recycle stream within the desorption section as hereinafter more fully described. Under these desorption conditions very little of the steam is removed from the desorption section with the rich gas containing the $C_3$ hydrocarbons and only small make-up amounts of steam are introduced by means of line 72, controlled by valve 73. The $C_3$ hydrocarbons, thus liberated from the adsorbent pass upward into disengaging section 60. A portion of said hydrocarbons continue upward into the secondary rectification section and serve as reflux to liberate from the charcoal adsorbed $C_2$ hydrocarbons and subsequently are adsorbed on the charcoal preferentially and return therewith through disengager 60 into desorption section 56. The remaining portion of the $C_3$ fraction liberated in the stripper passes from the charcoal into the free space provided by disengager 60 and is removed along with a small amount of stripping steam from the adsorber by means of line 74 controlled by valve 75 and conducted to the rich gas condenser 76. The stripped charcoal which may be termed a lean charcoal passes downward from the bottom of desorption section 56 through transfer line 63 and is discharged into line 64 for return to the top of the adsorber. The rich gas condenser 76 effects the condensation of any stripping steam which leaves with the rich gas. The cooled rich gas and the condensate, if any, is conducted by means of line 77 to drop out drum 78 where separation of any condensate from the rich gas containing the $C_3$ hydrocarbons takes place. The liquid phase is removed from the drum by means of line 79 controlled by automatic valve 80 which is operated to maintain a constant liquid level in drop out drum 78. The rich gas, consisting in this case of propylene-propane, is used as the recycle stream previously described and serves to enrich with an intermediate molecular weight hydrocarbon fraction the original feed to the primary fractionator 12. The rich gas is conducted from the drop out drum by means of line 81 and is compressed by compressor 82 sufficiently to enable the propylene-propane mixture to flow through line 11 by which it is introduced with the original unsaturated feed through line 10 into primary fractionator 12.

From the foregoing description it is apparent that I have provided means whereby gaseous mixtures containing olefinic or other thermally sensitive gases or otherwise unsaturated hydrocarbons may be separated into a number of fractions of high purity and at a high degree of recovery. This improved separation is accomplished by the cooperative functioning of fractional distillation and charcoal adsorption units. The fundamental variable governing the effective utilization of these two units in series is the recycle stream which adds to the raw feed to be treated a certain amount of a pure fraction of intermediate molecular weight. The amount of material recycled from the charcoal adsorption unit to the primary fractionator feed varies with individual cases, between about 5% and about 50% of the feed quantity or even higher. The actual amount of recycle used depends upon the desired product purity, the composition of the gas to be separated and economic considerations. When treating a gas oil cracking unit effluent dry gas for the preparation of a pure methane-hydrogen stream, an ethylene-ethane stream, and relatively pure $C_3$ and $C_4$ streams, the recycle amounts to about 15 mol per cent of the raw feed.

The preliminary distillation operation, which is made feasible through the use of such a recycle feed enrichment operation, prepares an overhead product containing no highly unsaturated components which are detrimental to the activity of the charcoal or other adsorbent. For such gases, the use of selective adsorption offers a convenient and more efficient means for separation. The recycle stream added to the feed effectively alters the temperatures of operation of the primary fractionator as described in the following example.

The presence of such light unsaturates as methylacetylene in cracked gases is harmful to charcoal activity. By allowing a substantial portion of the recycle stream components which have lower-boiling points than this compound, i. e. propane and propylene, to be present in the residue of the primary fractionator, the methyl acetylene is substantially completely retained in the residue stream from the primary fractionator and none is allowed to be present in the overhead which is fed to the charcoal adsorber.

The use of a propylene-propane recycle stream has two other important results on the operation conditions of the primary fractionator where recycle propylene-propane appear in both the overhead and bottoms products. First, the dew point of the overhead vapor is raised because of the presence of $C_3$ hydrocarbons which have higher boiling points than the other components present in this stream. The overhead temperature is increased thereby decreasing the refrigeration demand required in producing low temperature reflux. Secondly, the bubble point of the residue withdrawn from the bottom of the tower is lowered because of the presence therein of $C_3$ hydrocarbons which have lower boiling points than the other components of the residue. The bottoms temperature is decreased thereby to a value at which thermal polymerization of highly unsaturated hydrocarbons is not excessive. The top and bottom temperatures tend to approach one another with increasing amounts of recycle and the proper amount to use is generally determined from economic considerations. Components other than propylene or propane are applicable for use in recycle operations depending upon the raw feed composition and the desired composition of product fractions and their use in the foregoing discussion is not intended as a limitation of the process.

The use of preliminary fractionation in conjunction with the selective adsorption process when treating highly unsaturated hydrocarbon mixtures is preferable to attempting to treat such unsaturated stocks by either process separately. High recoveries of individual components may be realized by employing the process I have described with a secondary fractionator to separate the $C_3$ from the $C_4$ and heavier components and a secondary charcoal adsorber to further purify the ethylene-ethane or $C_2$ fraction.

The advantages made possible by the methods of operation herein disclosed may be more fully appreciated by reference to the following example:

Example I

A gaseous mixture of hydrogen and saturated and unsaturated hydrocarbons obtained from the thermal cracking of a gas oil at 1500° F. was treated according to the method previously described for the separation of various components. The analysis was:

| Component | Mols/Hr. | Mol Per Cent |
|---|---|---|
| Hydrogen | 16.0 | 16.2 |
| Methane | 26.8 | 27.2 |
| Ethylene | 38.3 | 38.8 |
| Ethane | 3.1 | 3.2 |
| Propylene | 8.5 | 8.6 |
| Propane | 0.8 | 0.8 |
| Methylacetylene | 1.2 | 1.2 |
| $C_4$'s and heavier | 4.0 | 4.0 |
| | 98.7 | 100.0 |

This feed was enriched by the addition of 12.4 mols per hour of a $C_3$ fraction, consisting predominantly of propylene, obtained as the rich gas from the selective adsorber unit. The primary fractionator was operated at 110 pounds per square inch gauge pressure and 87.1 mol per cent of the combined recycle and raw feed was taken overhead. The overhead product was used as the feed to the charcoal adsorber which produced an ethylene-ethane concentrate and the propylene stream which was used as recycle. By allowing 87% of the combined feed to be taken off as overhead, propylene and propane appear in both the overhead and bottom product streams. The presence of propylene in the overhead raised the overhead temperature from −50° F. which it would normally be at this pressure when treating non-enriched feed to −35° F. The bottoms temperature was lowered from 175° F. to 90° F. by using recycle propylene in the amount stated. The pressure of 110 p. s. i. g. was determined by the bottoms temperature when no recycle was used as this is an optimum value at which only small polymerization losses are noted. Operation of the primary fractionator at a somewhat higher pressure than 110 p. s. i. g. will further increase the column temperatures reducing the refrigeration demand for reflux overhead and producing a more convenient operating temperature from the bottoms. For example, operating the primary fractionator at a pressure of 200 p. s. i. g. increases the operating temperatures in the fractionator from −35° F. to about 10° F. in the overhead and from 90° F. to about 140° F. in the reboiler. Such changes still further reduce refrigeration demand and do not cause polymerization losses.

It is apparent that the primary fractionator and the charcoal adsorber operating together from the essential unit of the invention which permits processing of unsaturated mixtures with greater efficiency than possible heretofore. The charcoal adsorber prepares a $C_3$ stream of better than 97% purity and an ethylene concentrate comprising 75% $C_2$'s. The addition of the secondary fractionator permits production of an overhead stream containing the $C_3$ fraction and a bottoms product which consists largely of unsaturated $C_4$ hydrocarbon components and which is entirely free of methyl acetylene. The recovery of individual fractions made possible by recycle operations as described here are of the order 92% for ethylene, 96% for ethane, 95% for $C_3$ and $C_4$ hydrocarbons. The addition of a second selective adsorber to process the $C_2$ hydrocarbon concentrate would produce streams of greater ethylene concentration. The addition of a low temperature fractionator would also provide higher ethylene concentrations using the $C_2$ hydrocarbon concentrate as feed, however the temperatures are exceedingly low and pressures quite high for the latter case.

The charcoal employed in the above process is preferably granular, about 10 to 14 mesh although granules as large as about 4 mesh and as small as about 100 may be employed in specific instances. The term "charcoal" used in the foregoing description is meant to include any animal, vegetable, or mineral carbon, the preferable form being an activated vegetable charcoal.

The length of "life" of the charcoal, i. e., that duration of time in which the adsorbent exhibits its normal adsorption capacity, depends largely upon the nature of the components in the gaseous mixture fed to the adsorption unit. The presence of normally liquid hydrocarbons or compounds of similar molecular weight in the feed stream tend to accumulate on the carbon and slowly decrease its activity or capacity. Highly unsaturated compounds such as the heavier substituted acetylenes, butadienes, and cyclodienes tend to polymerize at the temperatures normally used for charcoal stripping and these polymers also lower the charcoal activity. This activity is restored in operation by subjecting the carbon to high temperature steam reactivation.

The maximum temperature to which the charcoal is heated during passage through the desorption section depends largely upon two conditions, the pressure at which the adsorption unit is operated and the molecular weight of the components adsorbed on the charcoal. Components of higher molecular weight are more strongly retained on the charcoal than the lower molecular weight compounds. For example, hydrogen of molecular weight 2.016 is only adsorbed to a slight degree and may be desorbed from the charcoal upon very moderate heating to temperatures of from about 150° F. to 225° F. Heavier materials such as pentanes and hexanes must be removed at more elevated temperatures in the range of 450° F. to 600° F. and removed in conjunction with a stripping agent such as steam. Should polymeric substances be formed on the charcoal from unsaturated gases such as the substituted acetylenes, butadiene, cyclopentadiene, or the like, due to the use of temperatures in the adsorption stage above about 200° F., or should heavy substances be present in the stream fed to the adsorption column, the charcoal adsorption capacity of the charcoal will decrease. Elevated temperatures of from about 800° F. to about 1200° F. must be used with a suitable stripping agent such as steam to remove these heavy materials from the charcoal in order to restore it to its original condition. Such an operation is generally conducted in a tubular heater connected in parallel with the charcoal adsorber and treats at high temperature a small fraction of the charcoal flow through the main unit.

In the desorption section situated at the bottom of the adsorption column a maximum stripping temperature must be maintained which is not only sufficiently high to permit a substantially complete removal of the components adsorbed on the charcoal but which is also sufficiently high to prevent accumulation of moisture on the charcoal leaving the bottom of the desorption section when steam is employed as the stripping agent. The presence of excessive amounts of moisture on the charcoal causes marked changes in the flow characteristics. Such moisture may cause clogging of the tubes in the desorption section or in the cooling section and also has a detrimental effect on the adsorption characteristics when the charcoal contacts the feed gas in the adsorption section. I have found that the temperatures required to accomplish the removal of the adsorbed compounds and still maintain the charcoal leaving the stripper in a substantially dry condition is in general a function of the pressure of desorption section operation. The variation of the minimum desorption temperature required to remove adsorbed components and give dry charcoal with pressure of operation is given in Figure II. The curve may be expressed mathematically by the equation $T = 175\ P^{0.191}$ where $T$ is the minimum temperature in °F. and $P$ is the operating pressure of the stripper in pounds per square inch absolute. The use of temperatures in the desorption section above the minimum shown in Figure II serves to substantially completely eliminate the presence of moisture on the charcoal. Any slight amounts of moisture remaining may be removed in the cooler by allowing a portion of the lean gas removed from the upper portion of the adsorption section to flow upward through the cooler countercurrent to the descending charcoal.

Because of the tendency of charcoal and other adsorbents to adsorb water vapor or steam preferentially over other gaseous compounds, steam is generally used as the stripping agent in removing adsorbed gaseous compounds from charcoal. I have also found that it is possible to operate the desorption section so that very little steam must be supplied to the bottom of the desorption section. An accumulation of steam maintained in the central portion of the tubular desorption section rises through the tubes into the cooler upper portion of the desorption section desorbing the adsorbed compounds and in turn being adsorbed on the charcoal. The charcoal containing the thus adsorbed steam moves downwardly through the stripper into the hotter portion thereof where temperatures sufficiently high to cause desorption of the steam exist. The steam subsequently leaves the charcoal and moves upward again to repeat the desorption cycle. In the upper portion of the desorption section where the desorbed gaseous components are removed only small amounts of the stripping steam are present as a vapor and, therefore, only small amounts are removed when the desorbed compounds are withdrawn as a rich gas. These small amounts of steam removed with the desorbed compounds must be made up by adding very small amounts of steam to the bottom of the desorption section. Such operation of charcoal desorption sections permits decreased amounts of stripping steam needed in operation resulting in a greater operation economy and also permits the discharge from the stripper of substantially anhydrous charcoal.

It is to be understood that the selective adsorption process as set forth herein is not limited in its scope by the particular gaseous mixtures or the specific adsorbent used in the description and illustration of the process. Similarly I do not wish to be limited by the use of a recycle stream consisting only of $C_3$ hydrocarbons which was applicable in the example used. The process as herein disclosed is applicable to the separation of individual components from a mixture of wide boiling point range which includes some thermally sensitive components. Thus, I may apply this method to gaseous mixtures other than mixtures of hydrocarbons.

Having described and illustrated my invention and realizing that many modifications thereof may occur to those skilled in the art without departing from the spirit or scope of the foregoing specification or of the following claims.

I claim:

1. A process for separating a normally gaseous mixture containing components of differing critical temperatures which comprises combining said gaseous mixture with a recycle stream consisting essentially of components having intermediate critical temperatures to form an enriched feed, introducing said enriched feed into a fractionation zone, separating from said enriched feed in said fractionation zone an overhead distillate containing components of lower critical temperature and a portion of the recycled components of intermediate critical temperature and a distillation bottoms containing components of higher critical temperature and the remaining portion of the recycled components of intermediate critical temperature whereby the condensation temperature of reflux is increased and the boiling temperature of the bottoms is decreased in said fractionation zone, introducing said overhead distillate into an adsorption zone, contacting therein said overhead distillate with a moving bed of granular solid absorbent, separating therein a fraction of said overhead distillate containing components of said gaseous mixture having intermediate critical temperatures, and employing at least a portion thereof as said recycle stream.

2. A process according to claim 1 wherein said granular solid adsorbent comprises activated charcoal.

3. A process for separating a normally gaseous mixture containing components of different boiling points which comprises combining said gaseous mixture with a recycle stream of components having intermediate boiling points and substantially free of components of lower and higher boiling points to form an enriched feed, introducing said enriched feed into a fractionating zone, separating therein from said enriched feed an overhead distillate containing components of lower boiling point together with a portion of said recycle stream which raises the condensation temperature of the reflux in said fractionation zone, and a distillation bottoms containing components of higher boiling point together with the remaining portion of said recycle stream which lowers the boiling point of said bottoms, introducing said overhead distillate into an adsorption zone, contacting said overhead distillate therein with a moving bed of granular solid adsorbent, separating therein a first fraction comprising those components of said gaseous mixture having the lower boiling point, separating therein a second fraction of said overhead distillate consisting of those components of intermediate boiling point, and employing at least a portion of said last named fraction as said recycle stream.

4. A process according to claim 3 wherein said granular solid adsorbent comprises activated charcoal.

5. A process for separating a normally gaseous mixture containing components of differing molecular weights into a plurality of portions each including components having similar molecular weights which comprises combining said gaseous mixture with recycled components of intermediate molecular weight to form an enriched feed, introducing said enriched feed into a fractionation zone, separating therein said enriched feed into an overhead distillate containing components of said gaseous mixture having lower molecular weights together with a portion of said recycled components of intermediate molecular weight and a distillation bottoms containing the components of said gaseous mixture having the higher molecular weight together with the remainder of said recycled components of intermediate molecular weight, introducing said overhead distillate into an adsorption zone, contacting said overhead distillate therein with a moving bed of granular adsorbent thereby adsorbing the components of intermediate molecular weight on said adsorbent, separating from said adsorption zone a first fraction containing components of said gaseous mixture having the lowest molecular weight, separating a second fraction of said gaseous mixture containing components of somewhat higher molecular weight than said first fraction, separating a third fraction of said overhead distillate comprising components of said intermediate molecular weight, and employing a portion of said third fraction as said recycled components of intermediate molecular weight.

6. A process according to claim 5 wherein said granular solid adsorbent comprises activated charcoal.

7. A process for separating a normally gaseous mixture containing hydrocarbon gases of differing molecular weights into a plurality of fractions containing said hydrocarbon gases in substantially pure form which comprises combining said gaseous mixture with recycled hydrocarbon gases of intermediate molecular weight to form an enriched feed, introducing said enriched feed into a fractionation zone, separating therein said enriched feed into an overhead distillate containing the hydrocarbon gases having the lower molecular weights together with a portion of the hydrocarbon gases of intermediate molecular weight and a distillation bottoms containing the hydrocarbon gases having the higher molecular weight together with the remainder of the components of intermediate molecular weight, introducing said overhead distillate into a selective adsorption zone, contacting said overhead distillate therein with a moving bed of activated charcoal, separating from said adsorption zone a lean gas containing the low molecular weight hydrocarbons of said gaseous mixture as a substantially unadsorbed gas, separating from said adsorption zone a side cut gas containing hydrocarbon gases having molecular weights higher than said lean gas and lower than a rich gas, separating from said adsorption zone said rich gas containing those hydrocarbons of intermediate molecular weight and higher molecular weight than said side cut gas and employing a portion of said rich gas as said recycled hydrocarbon gases of intermediate molecular weight.

8. A process for separating a normally gaseous mixture of saturated and unsaturated hydrocarbon gases of differing molecular weight into a plurality of fractions consisting of said hydrocarbon gases in pure form which comprises combining said normally gaseous mixture with a recycle stream consisting essentially of hydrocarbon gases of intermediate molecular weight to form an enriched feed, introducing said enriched feed into a fractionation zone, separating from said enriched feed in said fractionation zone an overhead distillate containing those hydrocarbon gases in said gaseous mixture having the lower molecular weight together with a portion of said hydrocarbon gases of intermediate molecular weight and a distillation bottoms containing those hydrocarbon gases of said gaseous mixture having the higher molecular weight together with the remaining portion of said hydrocarbon gases of intermediate molecular weight, introducing said overhead distillate into a selective adsorption zone, contacting said overhead distillate therein with a moving bed of activated charcoal, adsorbing on said charcoal the hydrocarbon gases of intermediate molecular weight from said recycle stream together with certain quantities of the lower molecular weight hydrocarbon gases, separating from said adsorption zone a lean gas consisting of those hydrocarbon gases of lowest molecular weight of said gaseous mixture as a substantially unadsorbed gas, desorbing from said charcoal a rich gas consisting essentially of hydrocarbon gases of intermediate molecular weight, and employing a portion of said rich gas as said recycle stream.

9. A process for separating a normally gaseous mixture of saturated and unsaturated hydrocarbon gases of differing molecular weights into a plurality of fractions consisting of said hydrocarbon gases in substantially pure form which comprises combining said gaseous mixture with a recycle stream containing hydrocarbon gases of intermediate molecular weight to form an enriched feed, introducing said enriched feed into a primary fractionation zone, separating said enriched feed into a primary overhead distillate containing those hydrocarbons of said gaseous mixture having the lower molecular weights together with a portion of the recycled hydrocarbons of intermediate molecular weight and a primary distillation bottoms containing those hydrocarbons of said gaseous mixture having the higher molecular weights together with the remaining portion of said recycled hydrocarbon gases of intermediate molecular weight, introducing said primary distillation bottoms into a secondary fractionation zone, separating said primary distillation bottoms therein into a secondary overhead distillate containing the hydrocarbon gases of said primary distillation bottoms having the lower molecular weights and a secondary distillation bottoms containing the hydrocarbons of said primary distillation bottoms having the higher molecular weights, introducing said primary overhead distillate into an adsorption zone, contacting said primary overhead distillate therein with a moving bed of activated charcoal, adsorbing on said activated charcoal the hydrocarbon gases of intermediate molecular weight in said primary overhead distillate together with some of the lower molecular weight hydrocarbon gases, separating from said adsorption zone a lean gas consisting of those hydrocarbon gases of lowest molecular weight as a substantially unadsorbed gas, separating from said adsorption zone a side cut gas consisting of those hydrocarbon gases having molecular weights higher than the hydrocarbons of said lean gas and less than the molecular weights of the hydrocarbons contained in a rich gas, heating said charcoal and desorbing the adsorbed hydrocarbons from said charcoal as said rich gas containing those hydrocarbons of intermediate molecular weight, and employing a portion of said rich gas as said recycle stream.

10. A process for separating a normally gaseous mixture of saturated and unsaturated hydrocarbon gases containing from 1 to 5 carbon atoms per molecule into a plurality of substantially pure fractions thereof which comprises combining said normally gaseous mixture with a recycle stream of $C_3$ hydrocarbons to form an enriched feed, introducing said enriched feed into a fractionation zone, separating therein said enriched feed into an overhead distillate consisting of the $C_1$ and $C_2$ hydrocarbons of said gaseous mixture together with a portion of the recycled $C_3$ hydrocarbon gases and a distillation bottoms consisting of the $C_4$ and $C_5$ hydrocarbons of said gaseous mixture together with the remaining portion of said recycled $C_3$ hydrocarbon gases, introducing said overhead distillate as a vapor into an adsorption zone, contacting said vapor in said adsorption zone with a moving bed of activated charcoal, adsorbing thereon in said adsorption zone said $C_3$ hydrocarbons together with a portion of said $C_2$ and $C_1$ hydrocarbons, contacting said charcoal with additional quantities of $C_2$ hydrocarbons thereby desorbing from said charcoal said adsorbed $C_1$ hydrocarbon, separating from said adsorption zone as a lean gas the desorbed $C_1$ hydrocarbon together with unadsorbed $C_1$ hydrocarbon, removing from said adsorption zone said lean gas consisting of substantially pure $C_1$ hydrocarbon, contacting said charcoal with additional quantities of $C_3$ hydrocarbons desorbing thereby said adsorbed $C_2$ hydrocarbons, withdrawing from said adsorption zone said desorbed $C_2$ hydrocarbons together with unadsorbed $C_2$ hydrocarbons in substantially pure form as a side cut gas, flowing said charcoal from said adsorption zone downwardly through a desorption zone, heating therein said charcoal and contacting said charcoal with a stripping gas thereby desorbing said absorbed $C_3$ hydrocarbons to form a rich gas, withdrawing from said desorption zone said rich gas containing said $C_3$ hydrocarbons, and employing a portion of said rich gas as said recycle stream.

11. A process according to claim 10 wherein said stripping gas comprises steam introduced into a lower portion of said desorption zone and is passed therethrough countercurrently to said charcoal, said steam is removed from the upper portion of said desorption zone together with said rich gas and said steam is subsequently separated from said rich gas prior to employing a portion of said rich gas as said recycle stream.

12. An apparatus for separating a normally gaseous mixture containing components of differing critical temperature which comprises fractionation means and selective adsorption means, means for combining said gaseous mixture with a recycle stream containing components of intermediate critical temperature and substantially free of components of higher and lower critical temperature to form an enriched feed, means for introducing said enriched feed into said fractionation means, means for removing an overhead distillate as a vapor from said fractionation means, means for introducing said vapor into said selective adsorption means, means in said selective adsorption means for contacting said vapor with a moving bed of granular solid adsorbent, means for desorbing from said granular solid adsorbent a fraction of said vapor rich in said components of intermediate critical temperature and means for returning a portion of said fraction as said recycle stream.

13. An apparatus according to claim 12 in combination with means for recirculating said granular solid adsorbent as a moving bed through said selective adsorption means.

14. An apparatus for separating a normally gaseous mixture containing components of differing boiling points which comprises fractionation means and selective adsorption means, means for combining said gaseous mixture together with a recycle stream containing components of intermediate boiling point and substantially free of components of higher and lower boiling point to form an enriched feed, means for introducing said enriched feed into said fractionation means, means for removing from said fractionation means an overhead distillate as a vapor, means for removing from said fractionation means a distillation bottoms as a liquid, means for introducing a portion of said overhead distillate as a vapor into said selective adsorption means, means therein for contacting said vapor with a moving bed of granular adsorbent, means for withdrawing from said adsorption means a first fraction consisting of those components of said gaseous mixture having the lowest boiling point, means for withdrawing from said selective adsorption means a second fraction consisting essentially of said components having intermediate boiling points, and means for returning a portion of said second fraction as said recycle stream.

15. An apparatus according to claim 14 in combination with means for recirculating said granular solid adsorbent as a moving bed through said selective adsorption means.

16. An apparatus for separating a normally gaseous mixture containing hydrocarbons of differing molecular weights which comprises fractionation means and selective adsorption means, means for combining said gaseous mixture with a recycle stream containing hydrocarbons of intermediate molecular weight to form an enriched feed, means for introducing said enriched feed into said fractionation means, means for removing from said fractionation means an overhead distillate as a vapor, means for condensing a portion of said vapor to form a liquid, means for returning said liquid to said fractionation means as reflux, means for removing from said fractionation means a distillation bottoms as a liquid, means for vaporizing a portion of said liquid, means for returning said vaporized liquid to said fractionation means to supply heat thereby, means for introducing the remaining portion of said overhead distillate as a vapor into said selective adsorption means, means therein for contacting said vapor with a moving bed of activated charcoal flowing downwardly through said selective adsorption means by gravity, means for withdrawing from said selective adsorption means a first fraction consisting of those hydrocarbons of said gaseous mixture having the lowest molecular weight as a substantially unadsorbed gas, means for removing a second fraction consisting of hydrocarbons having molecular weights higher than those of said first fraction, means in said selective adsorption means for heating said activated charcoal and desorbing the adsorbed hydrocarbons as a third fraction having molecular weight higher than said second fraction and means for returning a portion of said third fraction as said recycle stream.

17. An apparatus for separating a normally gaseous mixture of saturated and unsaturated hydrocarbon gases of differing molecular weight into a plurality of fractions consisting of said hydrocarbon gases in substantially pure form which comprises primary fractionation means, secondary fractionation means and selective adsorption means, means for combining said gaseous mixture with a recycle stream consisting of hydrocarbons of intermediate molecular weight to form an enriched feed, means for introducing said enriched feed into said primary fractionation means, means for removing from said primary fractionation means a primary overhead distillate as a vapor, means for condensing a portion of said vapor to form a liquid, means for introducing said liquid into said primary fractionation means as reflux, means for removing from said primary fractionation means a primary distillation bottoms as a liquid, means for vaporizing a portion of said liquid to form a vapor, means for introducing said last named vapor into the bottom of said fractionation means, means for introducing the remaining portion of said primary distillation bottoms into said secondary fractionation means, means for removing from said secondary fractionation means a secondary overhead distillate as a vapor, means for condensing at least a portion of said vapor to form a liquid, means for introducing said liquid into said secondary fractionation means as reflux, means for removing the remaining portion of said liquid as a substantially pure product, means for removing from said secondary fractionation means a secondary distillation bottoms as a liquid, means for vaporizing a portion of said liquid to form a vapor, means for introducing said last named vapor into the bottom of said secondary fractionation means, means for cooling the remaining portion of said liquid, means for removing the cooled liquid as a substantially pure product, means for introducing the remaining portion of said primary overhead distillate as a vapor into said selective adsorption means, means therein for contacting said last named vapor with a moving bed of activated charcoal flowing downwardly by gravity through said selective adsorption means, means for removing from said selective adsorption means a first fraction consisting of hydrocarbons of said gaseous mixture of the lowest molecular weight, means for removing a second fraction consisting of hydrocarbons of molecular weight somewhat higher than said first fraction, means in said selective adsorption means for heating said activated charcoal in contact with steam to desorb therefrom the adsorbed hydrocarbons of molecular weight higher than those of said second fraction to form a rich gas, and means for returning at least a portion of said rich gas as a recycle stream.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,758,661 | Hagen | May 13, 1930 |
| 1,825,707 | Wagner, Jr. | Oct. 6, 1931 |
| 2,067,349 | Schuftan | Jan. 12, 1937 |
| 2,111,822 | Sullivan | Mar. 22, 1938 |
| 2,190,662 | Houdry | Feb. 20, 1940 |
| 2,222,276 | Babcock | Nov. 19, 1940 |
| 2,240,433 | Atwell | Apr. 29, 1941 |
| 2,355,589 | Brandt | Aug. 8, 1944 |